United States Patent [19]

Johnson et al.

[11] Patent Number: 4,977,589

[45] Date of Patent: Dec. 11, 1990

[54] SIGNALLING AND CONTROL PROTOCOL FOR A COMMUNICATION SYSTEM

[75] Inventors: Brian K. A. Johnson; Stelios J. Patsiokas, both of Plantation, Fla.

[73] Assignee: Motorola, Inc., Schaumburg, Ill.

[21] Appl. No.: 275,876

[22] Filed: Nov. 25, 1988

[51] Int. Cl.$^5$ .............................................. H04B 7/26
[52] U.S. Cl. ......................................... 379/58; 379/63
[58] Field of Search ...................... 455/33; 379/58, 59, 379/60, 62, 63, 131, 121, 124, 140, 192, 191, 190, 251, 257, 177, 182, 184, 266, 92, 93, 89, 90, 214

[56] References Cited

U.S. PATENT DOCUMENTS 4,785,408 11/1988 Britton et al. ................... 379/88 X
4,788,715 11/1988 Lee ................................. 379/88 X

FOREIGN PATENT DOCUMENTS

0076558 4/1988 Japan .................................. 379/266

*Primary Examiner*—James L. Dwyer
*Attorney, Agent, or Firm*—Michael J. Buchenhorner

[57] ABSTRACT

A signalling and control protocol is provided wherein each subscriber unit (106) operating within a communication system (100) must transmit a request (200, 200' or 200") to communicate to a central station. If a communication channel is available, the central station returns a channel grant (210), which includes a time code representing a time duration during which the requesting subscriber may communicate. After receiving the channel grant (210), the subscriber unit may communicate for a time interval not exceeding the time duration, and, immediately prior to the expiration of the time duration, the subscriber unit may itself provide a warning tone indicating the impending loss of the communication channel. Conversely, if a communication channel is not available, the central station provides a busy message (216), which includes a code (218) representing the requesting subscriber unit's position is a call request queue.

32 Claims, 6 Drawing Sheets

SIGNALLING AND CONTROL PROTOCOL FOR A COMMUNICATION SYSTEM

TECHNICAL FIELD

This invention relates generally to radio frequency (RF) communications systems, and more specifically to half-duplex (or simplex) RF communication systems, and is more particularly directed toward a signalling and control protocol for such half-duplex (or simplex) communication systems.

BACKGROUND ART

Contemporary multi-channel radio frequency (RF) communication systems typically employ one or more channels to pass signalling and control information to subscriber units. Generally, each subscriber desiring to use the communication system must transmit a call request code and receive a channel grant code before any transmissions between subscriber units may commence.

Since the communication resources of RF communication systems are limited, it is known to limit the duration of any single transmission to a predetermined time interval. Should a subscriber attempt to transmit beyond this time interval, a warning tone precedes automatic preemption of the communication, and the communication channel is reassigned to other subscribers. While this procedure works well for full-duplex subscriber units, it is ineffective for half-duplex (or simplex) subscriber units because the system controller is not able to "time out" a transmitting half-duplex (or simplex) subscriber unit. That is, since the half-duplex (or simplex) subscriber units cannot simultaneously receive information while transmitting, they cannot receive the warning tone prior to call termination. Of course, the half-duplex (or simplex) transmissions could be interrupted without warning, however, this practice would likely confuse and frustrate the subscribers and impede effective communication. Accordingly, a need exists in the art to limit the transmission time of half-duplex (or simplex) subscriber units without disrupting the efficient operation of the communication system.

SUMMARY OF THE INVENTION

Accordingly, it is an object of the present invention to provide a signalling and control protocol capable of limiting the duration of communications involving half-duplex (or simplex) subscriber units.

Briefly, according to the invention, each subscriber unit must transmit a request to communicate to a central station. If a communication channel is available, the central station returns a channel grant, which includes a time code representing a time duration during which the requesting subscriber may communicate. The time duration may be determined by analysis of system loading, time-of-day, or the amount of system usage by the requesting subscriber over a predetermined time period. After receiving the channel grant, the subscriber unit may communicate for a time interval not exceeding the time duration, and, immediately prior to the expiration of the time duration, the subscriber unit may itself provide a warning tone indicating the impending loss of the communication channel.

In another aspect of the invention, the central station provides a busy message if a communication channel is not available. The busy message includes a code representing the requesting subscriber unit's position is a waiting queue, which enables the subscriber to approximate the time until a communication channel may become available.

DETAILED DESCRIPTION OF THE PREFERRED EMBODIMENT

Figure 1:
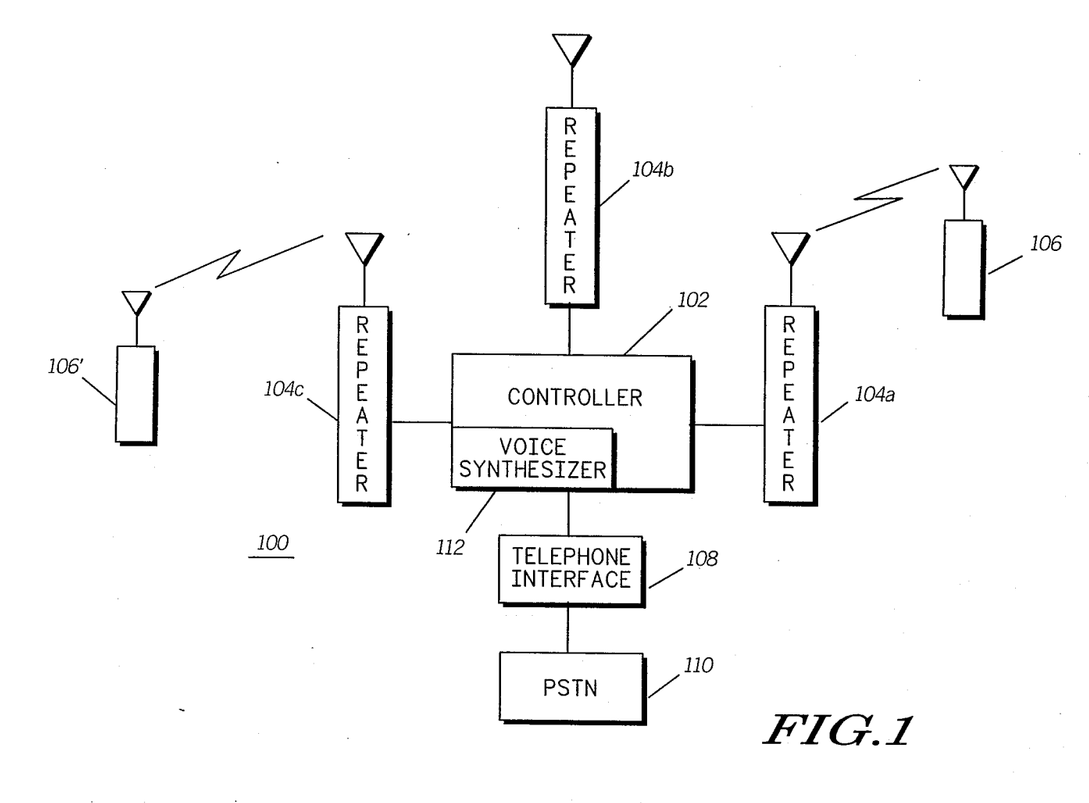
FIG. 1 is a block diagram of a communication system in accordance with the present invention.

Referring to FIG. 1, a block diagram of a communication system 100 in accordance with the present invention is shown. The communication system 100 comprises a central unit (or station) having a controller 102 coupled to and controlling a plurality of repeaters 104a–104c to facilitate communication between a plurality of subscriber units (two shown). Preferably, the central station also includes a telephone interface 108, which interconnects the controller 102 with a conventional public switched telephone network (PSTN) 110. In this way, conventional telephone parties (interconnect callers) may access the communication system 100 and communicate with subscribers operating within the communication system 100. Additionally, the controller may send messages to interconnect callers via a voice synthesizer 112, a voice recording, or their functional equivalents.

To establish a call, a requesting subscriber unit 106 is required to transmit a call request to the central station. Preferably, the call request includes information identifying the requesting subscriber and the subscriber(s) with whom the requesting party desires to communicate. If a channel is available, the central station transmits a channel grant, which identifies the communication channel upon which communication may commence. Upon receipt of the channel grant, the requesting subscriber unit 106 moves to the identified communication channel as a transmitting unit, while the called subscriber unit(s) 106' move to the identified communication channel as listening units.

Since the number of communication channels available on the communication system 100 is limited, it is desirable to limit the duration of any single transmission. For full-duplex subscriber units this would not present a significant obstacle since full-duplex subscriber units may transmit and receive information simultaneously. Thus, it is known to transmit a warning tone to full-duplex subscriber units prior to terminating the call and reallocating the communication channel. However, the present invention contemplates the use of half-duplex (or simplex) subscriber units that operate to transmit or receive (but not both) at any particular instant. Accordingly, if the subscriber unit 106 continued to transmit beyond the time permitted, the central station may be able to transmit a warning tone to the listening subscriber unit(s) 106', but not to the transmitting subscriber unit 106. Therefore, the transmitting subscriber unit 106 would not be warned of the impending call termination. Of course, the communication channel could be reclaimed without warning, however, this would likely confuse and frustrate the subscribers, and impede efficient communication within the communication system 100.

Figure 2:
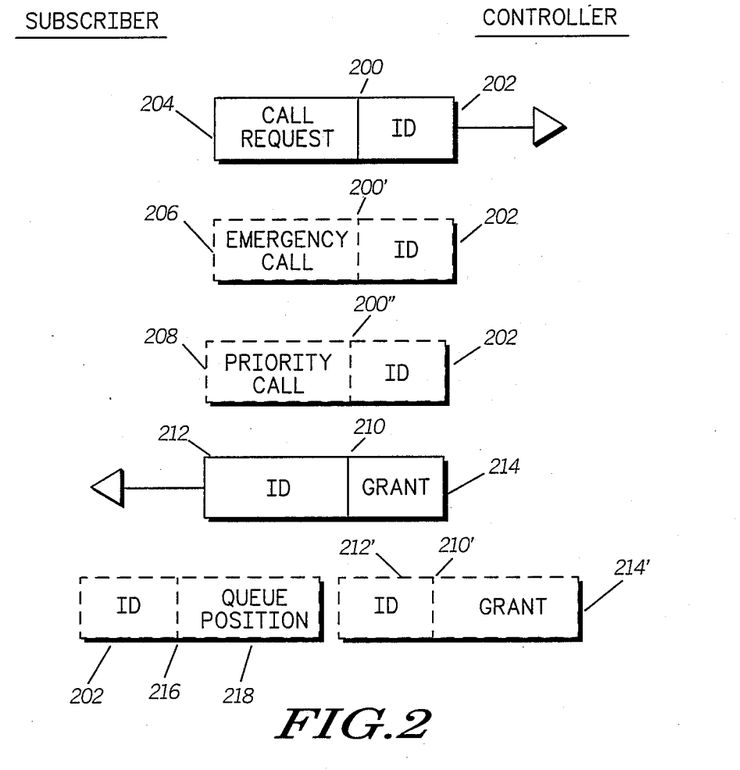
FIG. 2 is an illustration of the signalling exchange between the central station and a subscriber of FIG. 1 in accordance with the present invention.

Referring to FIG. 2, an illustration of the signalling and control protocol to establish a call in accordance with the present invention is shown. To establish a call, a requesting subscriber unit 106 must transmit a call request 200 to the central station. Preferably, the call request 200 comprises an identification (ID) portion 202, which includes at least the identification code of the requesting subscriber unit 106, and may include the identification code(s) of the called subscriber(s). Optionally, the ID code(s) of the called subscriber(s) 106' may be located in the call request portion 204, which includes status or control information, such as, the type of call desired (i.e., calling another subscriber, calling a telephone party, or calling a group of subscribers).

In addition to the "general" call request 200, the present invention contemplates that the requesting subscriber unit 106 may transmit an emergency call request 200', which includes the ID portion 202 and an emergency call portion 206. The emergency call request 200' may be transmitted in those situations requiring immediate action to reduce or prevent the loss of life or damage of property. Preferably, the central station operates to immediately grant a communication channel to any subscriber unit transmitting an emergency call request 200', which includes preempting a communication between other subscriber units (except another emergency call) to allow the subscriber unit requesting the emergency call to have immediate and unlimited access to the communication channel.

In some situations, the subscribers operating within the communication system 100 are organized into a hierarchical arrangement. For example, a police department may be organized with the police chief having the highest priority, followed by district commanders, their lieutenants, various patrol zones, and the individual officers patrolling those zones. Responsive to hierarchical organizations, the present invention contemplates that a requesting subscriber unit 106 may transmit a priority call request 200", which comprises at least the identification portion 202 and a priority call code 208, which represents one of a plurality of hierarchically organized priority codes corresponding to the hierarchical organization of the subscribers operating within the communication signal 100. According to the invention, the central station operates to grant varying amounts of communication time depending upon the priority level of the requesting subscriber unit.

Upon processing the call request, the central station returns a channel grant code 210, which includes an identification portion 212, which comprises at least the identification code of the requesting subscriber unit 106 and may optionally include the identification code(s) of the called subscriber unit(s) 106'. Optionally, the ID code(s) of the called subscriber unit(s) may be contained in the grant portion 214, which identifies a communication channel upon which to communicate, and also includes a time code representing the time duration that the subscriber units are permitted to communicate. According to the invention, the time code defining the time duration that communication is permitted may be based upon any one or a combination of several factors including: a determination of the current system loading, the time-of-day that the call request was processed; the priority level of the requesting subscriber; and, the amount of time that the requesting subscriber has communicated on the communication system within a predetermined time interval. That is, if one or more subscriber units are repeatedly and excessively consuming communication resources, subsequent call requests by these excessive users, may receive shorter time durations with which to communicate. In this way, communication resources may be more evenly distributed among the subscriber units operating within the communication system.

If a communication channel is not available when a call request is received, the central station preferably transmits a busy code 216, which includes at least the identification code 202 of the requesting subscriber unit, and a queue position 218. The information contained in the queue position portion 218 of the busy code 216 represents the requesting subscriber's position in a waiting queue (i.e., third, fourth, fifth, etc.). This information is received and processed by the requesting subscriber unit 106 and may be displayed on a display means of the subscriber unit so that the requesting subscriber may approximate the amount of time before a communication channel becomes available. In the case of an interconnect (telephone) caller, the queue position information may be transmitted via the voice synthesizer 112, a voice recording, or any other suitable means to provide a meaningful voice message to the telephone party. When the call request contained in the waiting queue reaches the top of the queue, the channel grant 210' follows the busy code 216, which automatically informs the subscriber units that a channel is now available. Upon receiving the channel grant code 210', communication between the subscriber units may commence for the time duration contained in the grant portion 214' of the channel grant 210'.

After receiving the channel grant code 210, each subscriber unit operates to program a timing mechanism within the subscriber unit to the time duration contained in the grant portion 214 of the channel grant code 210. At a predetermined interval (preferably 5 seconds) before the expiration of the time duration, each subscriber unit activates a warning tone that will be heard by both transmitting and receiving subscriber units. In this way, the subscribers are informed of the impending termination of the call, regardless of whether they are currently transmitting and operationally unable to receive other messages from the central station.

Figure 3A:
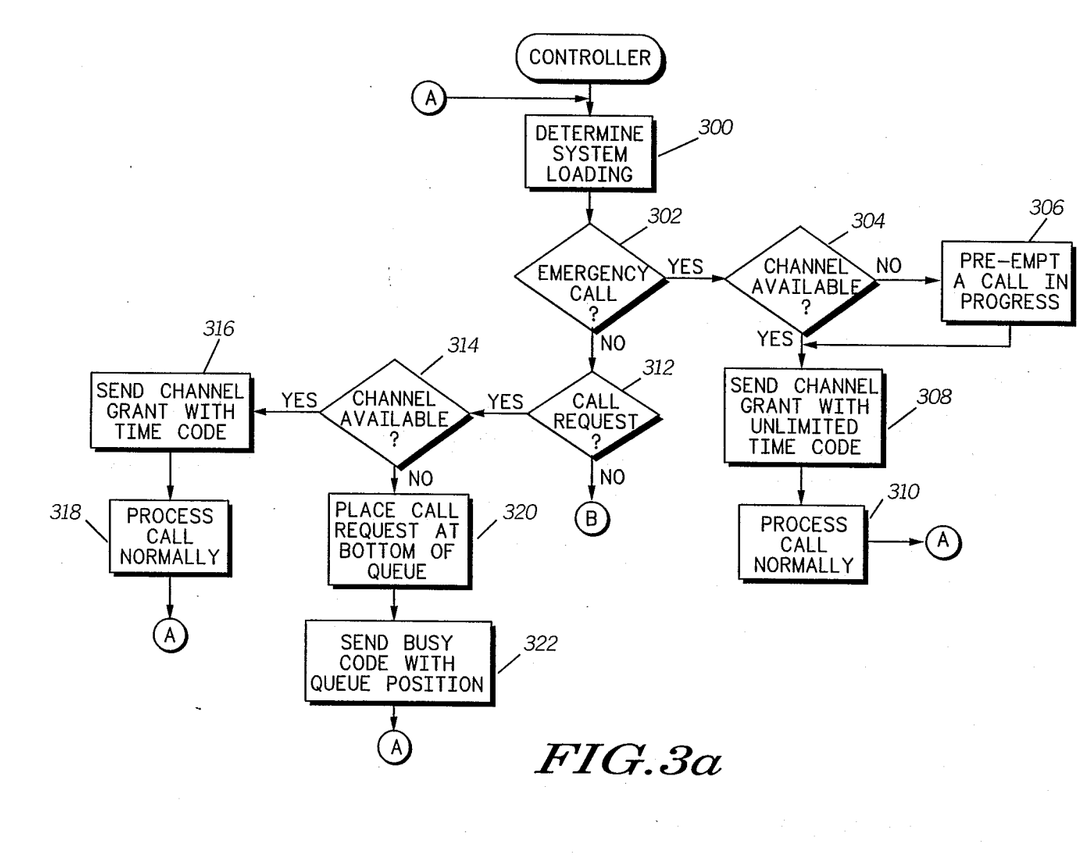
FIGS. 3a and 3b are flow diagrams illustrating the operation of the central station of FIG. 1.
Figure 3B:
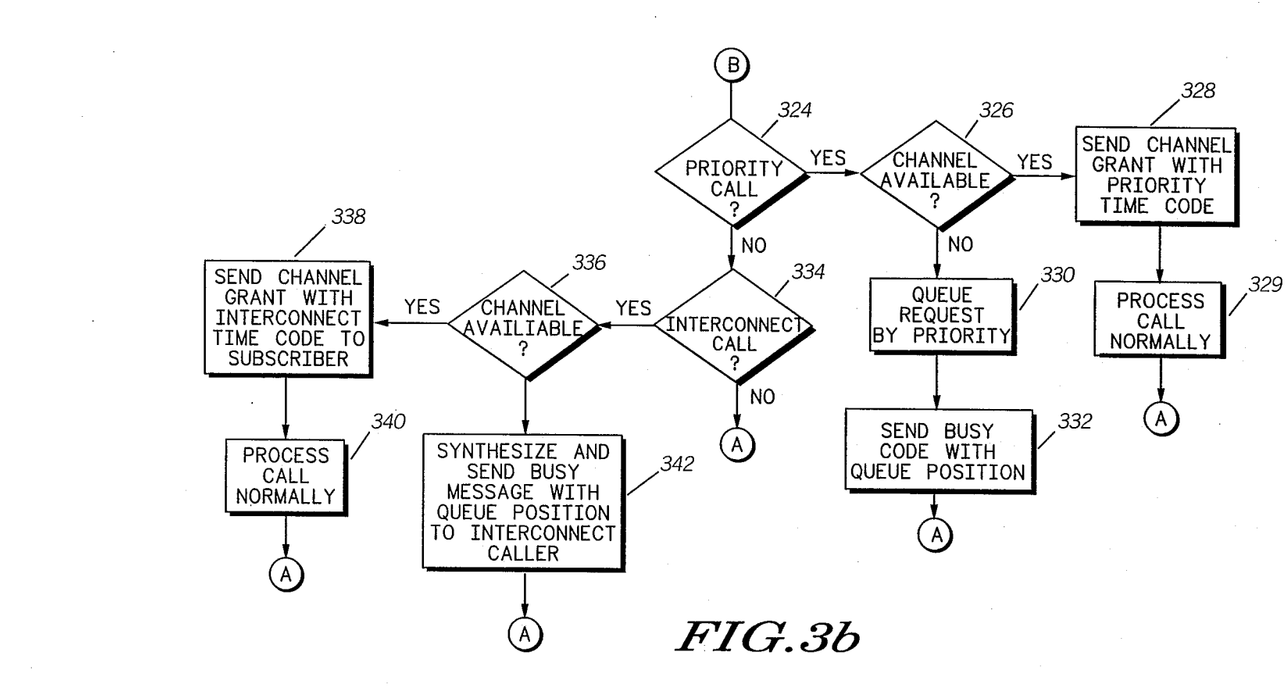

Referring to FIGS. 3a and 3b, a flow diagram illustrating the operation of the controller 102 is shown. In FIG. 3a, the routine begins in step 300 where the system loading is determined. The determination of the system loading preferably is used either alone or in combination with other factors to set the time duration for a requested communication. In addition to the current system loading, the controller 102 may take into account the time-of-day that the call request was received, the priority level of the call request received, or the amount of communication resources that have been consumed by the requesting subscriber unit. In decision 302, the routine determines whether the received call request comprised an emergency call request 200'. If an emergency call request was received, the routine proceeds to decision 304, which determines whether a channel is available. If not, the central system determines (step 306) which call in progress to preempt to provide a channel to the emergency caller (the system will not preempt another emergency call). Once this determination was made, or in the event that communication channel is available, the channel grant code 206 is transmitted to the subscriber units (step 308), which includes an unlimited time code in the grant portion 214. That is, the present invention operates to grant the emergency caller unlimited time on the communication channel to respond to the emergency as opposed to limiting the duration of an emergency call. Following this, the controller operates to process the call normally (step 310), and returns to reference letter A at the conclusion of call.

Assuming now that the determination of decision 302 was that an emergency call request 200' was not received, the routine proceeds to decision 312, which determines whether a "general" call request code 200 was received. If not, the routine proceeds to reference letter B of FIG. 3b. However, if a call request was received the routine proceeds to decision 314 which determines whether a channel is available. If so, the controller 102 operates to send the channel grant code 210 (step 316), which contains the time code defining the amount of time that the call may consume. Following this, the call is processed normally (step 318), and the routine returns to reference letter A at the conclusion of the call. Conversely, if the determination of decision 314 is that a channel is not available, the call request 200 is placed at the bottom of the call waiting queue (step 320), and the routine proceeds to step 322, where the busy code 216 is transmitted to the requesting subscriber unit 106. According to the invention, the busy signal code 216 contains the queue position 218, which enables the subscriber units to display the queue position to the requesting subscriber on any suitable display means. Following, this the routine proceeds to reference letter A.

Referring to FIG. 3b, the routine continues in step 324, which determines whether a priority call request 200" has been received. If so, the routine proceeds to decision 326, which determines whether a channel is available. If so, the routine proceeds to step 328, where the channel grant code 210 is transmitted to the subscriber units. Preferably, the time code included in the grant portion 214 of the grant code 210 is based upon the priority level of the requesting subscriber in addition to one or more of the system parameters discussed previously. Following this, the call is processed normally (step 329), and at the conclusion of the call, the routine proceeds to reference letter A of FIG. 3a. However, if the determination of decision 326 is that a channel is not available, the priority call request 200" is positioned in the call waiting queue in accordance with the priority level of the requesting subscriber. That is, a priority call request 200" may be positioned in the middle, bottom, or at the top of the queue depending upon the priority level of the requesting subscriber unit 106 as compared against the priority of any call request already residing in the waiting queue. In this way, a priority caller may be more rapidly granted a communication channel, as well as being granted an extended time duration to communicate. Following this, the routine proceeds to step 332, where the busy code 216 is transmitted containing the queue position 218 to inform the priority subscriber of his or her position in the waiting queue.

Assuming, however, that the determination of decision 324 is that a priority call request 200" was not received, the routine proceeds to decision 334, which determines whether an interconnect caller has contacted the controller 102 via the PSTN 110 and the telephone interface 108. A negative determination of decision 334 routes control to reference letter A of FIG. 3a. However, if an interconnect call has been received, the routine proceeds to decision 336, which determines whether a channel is available. If so, the routine proceeds to step 338, where a channel grant code 210 is transmitted to the called subscriber unit(s) 106', which contains the grant code 214 that identifies the communication channel upon which to communicate and provides a time code representing a time duration for the interconnect call. According to the invention, an interconnect call may be provided with a longer time duration than a "dispatch" (i.e., subscriber-to-subscriber) call. After sending the channel grant code 210, the interconnect call is processed normally (step 340), and at the conclusion of the call, the routine proceeds to reference letter A of FIG. 3a. Conversely, if the determination of decision 336 is that a channel is not available, the controller 102 operates to synthesize (112) a busy message, which is transmitted together with the queue position to the interconnect caller via the telephone interface 108 and the PSTN 110. In this way, the interconnect caller may approximate the time duration before attempting to re-contact the central station.

Figure 4A:
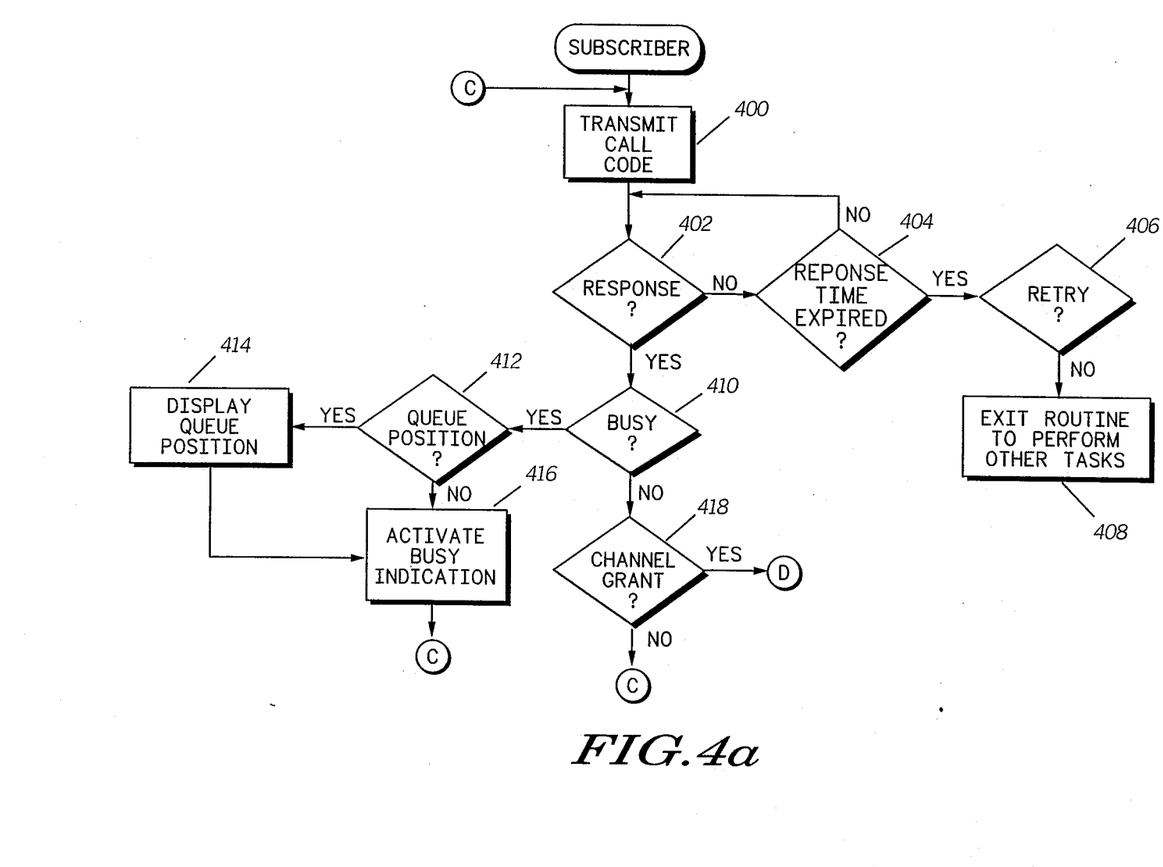
FIGS. 4a and 4b are flow diagrams illustrating the operation of a subscriber unit of FIG. 1.
Figure 4B:
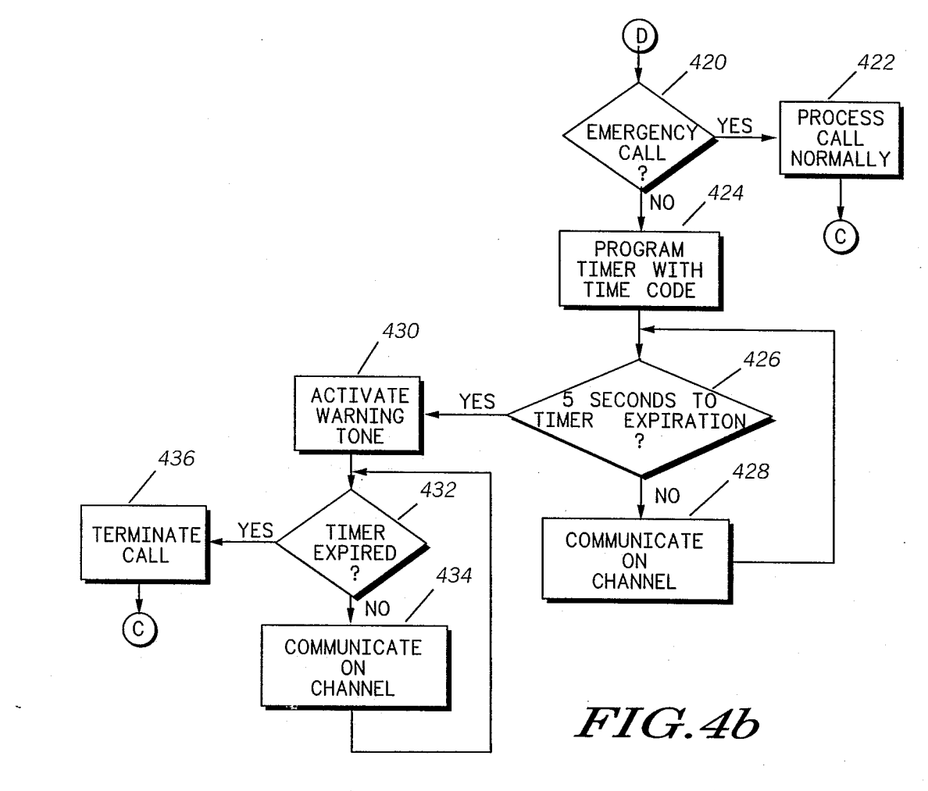

Referring to FIGS. 4a and 4b, flow diagrams illustrating the operation of a subscriber unit in accordance with the present invention are shown. The routine begins in step 400, where the requesting subscriber unit 106 transmits a call request (either 200, 200' or 200") to the central station. In step 402, the subscriber unit determines whether the response was received from the central station. If not, decision 404 determines whether a predetermined response time has expired. If not, the routine operates in the "loop" formed by decisions 404 and 402 until a response is received from the central station, or the time for response has expired. If the determination of decision 404 is that the response time has expired, the routine proceeds to decision 406, which determines whether the subscriber unit should retry the call request. Accordingly to the invention, each subscriber unit may automatically retry the transmission of the call request if the central station fails to respond. Accordingly, an affirmative determination of decision 406 routes the routine to step 400 where the call request code is re-transmitted. Conversely, a negative determination of decision 406 routes control to step 408, where the subscriber routine exits and the subscriber unit operates normally by performing other tasks in accordance with any operational program stored within the subscriber unit.

Assuming now that the determination of the decision 402 was that a response was received, the routine proceeds to decision 410, which determines whether a busy code 216 was received. If so, the routine proceeds to decision 412, which determines whether the queue position 218 was transmitted with the busy code 216. According to the invention, decision 214 is included in the operational program of the subscriber unit to provide cross-compatibility with communication systems that employ both aspects of the present invention, and those communication systems that limit the transmit time duration but do not implement the queue position aspect of the present invention. According, an affirmative determination of decision 412 routes the routine to step 414, where the subscriber unit displays the received queue position on any suitable display means. Following this, or in the event of a negative determination of decision 412, the routine proceeds to step 416, where a busy indication (such as an audible tone) is activated to inform the subscriber of the busy condition of the communication system 100. Following this, the routine proceeds to reference letter C.

Assuming that the determination of decision 410 was that a busy code was not received, the routine proceeds to decision 418, which determines whether a channel grant code 210 was received. If not, the routine proceeds to reference letter C. Conversely, if a channel grant was received, the routine proceeds to reference letter D of FIG. 4b.

Referring to FIG. 4b, the routine continues in decision 420, which determines whether an emergency channel grant was received. The subscriber unit may determine this either by operating upon the assumption that a channel grant code received in response to an emergency call request is an emergency channel grant, or upon determination that an unlimited time duration has been granted the requesting subscriber unit 106. According to the invention, only emergency calls are provided with an unlimited time duration, and thus, comprise an emergency channel grant. Accordingly, if a channel grant has been received in response to an emergency call request, the routine proceeds to step 422, where the emergency call is processed normally to its conclusion, after which the routine proceeds to reference letter C of FIG. 4a.

Assuming that the determination of decision 420 was that emergency call was not received, the subscriber unit operates to program a timer with the time code contained in the grant portion 214 of the channel grant 210. The time code may vary depending upon whether a priority call request 200" or a "general" call request 200 was transmitted, and upon other factors considered by the central station. In any event, the timer is programmed for whatever time duration the central has allocated for the communication and the routine proceeds to decision 426 which determines whether a predetermined time period (preferably 5 seconds) before the expiration of the time duration has been reached. If not, the subscriber unit operates to communicate on the channel (step 248), while continuing to determine the timer's progress in decision 426. Upon the determination that 5 seconds to expiration of the timer has been reached, the routine proceeds to step 430, where a warning tone is activated by the subscriber unit indicating the eminent loss of the communication channel. Following this, the routine proceeds to decision 432, which determines whether the timer has completely expired. If not, the routine proceeds to step 434, where the subscriber may communicate on the channel for the remainder of the time duration. However, when decision 432 determines that the timer has completely expired, the call is terminated (step 436), after which the routine proceeds to reference letter C of FIG. 3a.

What is claimed is:

1. In a two-way communication system having a central station for allocating at least one communication channel among a plurality of subscriber units, a signalling and control method for limiting the duration of a transmission by a subscriber unit, comprising the steps of: at a radio subscriber unit:
   (a) transmitting a message representing a request to communicate;
   (b) receiving a code representing a time duration during which said radio subscriber unit may communicate; and,
   (c) communicating for a time interval not exceeding said time duration.

2. The method of claim 1, wherein step (a) comprises transmitting said message representing an emergency request to communicate.

3. The method of claim 2, wherein step (b) comprises receiving said code representing an unlimited time duration during which said radio subscriber unit may communicate.

4. The method of claim 1, wherein step (c) comprises the steps of:
   (c1) programming a timer means to said time duration;
   (c2) communicating for said time interval not exceeding the expiration of said timer means.

5. The method of claim 4, wherein step (c) comprises the steps of:
   (c1) programming a timer means to said time duration;
   (c2) communicating for said time interval not exceeding expiration of said timer means; and,
   (c3) activating a warning signal a predetermined time before said timer means expires.

6. In a two-way communication system having a central station for allocating at least one communication channel among a plurality of subscriber units, a signalling and control method for limiting the duration of a transmission by a subscriber unit, comprising the steps of:
   at a radio subscriber unit:
   (a) transmitting a message representing a request to communicate;
   (b) receiving a code representing a time duration during which said subscriber unit may communicate;
   (c) communicating for a time interval not exceeding said time duration;
   at the central station:
   (a) receiving said message representing said request to communicate;
   (b) determining said time duration during which said radio subscriber unit may communicate; and,
   (c) transmitting said code representing a time duration during which said radio subscriber unit may communicate.

7. The method of claim 6, wherein step (b) of said central station comprises the step of determining said time duration during which said subscriber unit may communicate based upon when said message representing said request to communicate was received.

8. The method of claim 6, wherein step (b) of said central station comprises the step of determining said time duration during which said subscriber unit may communicate based upon examining traffic volume on the communication system.

9. The method of claim 6, wherein step (b) of said central station comprises the step of determining said time duration during which said subscriber unit may communicate based upon a determination of how many call requests were received from said subscriber during a time interval.

10. The method of claim 6, wherein step (b) of said central station comprises the step of determining said time duration during which said subscriber unit may communicate based upon a determination of how much time to communicate said subscriber has been allocated during a time interval.

11. The method of claim 6, wherein step (b) of said central station comprises the step of determining said time duration during which said radio subscriber unit may communicate based upon a whether said message representing said request to communicate was an emergency request to communicate.

12. The method of claim 6, wherein step (b) of said central station comprises the step of determining said time duration during which said subscriber unit may communicate based upon a determination of communication time actually used by said subscriber unit during a time interval.

13. In a two-way communication system having a central station for allocating at least one communication channel among a plurality of subscriber units, a signalling method for apprising a subscriber of an approximate duration until a communication channel becomes available, comprising the steps of:
at a radio subscriber unit:
(a) transmitting a message representing a request to communicate;
(b) receiving a code representing a queue position indicating a number of other subscriber units that may communicate prior to said radio subscriber unit being allowed to communicate; and,
(c) displaying said queue position.

14. In a two-way communication system having a central station for allocating at least one communication channel among a plurality of subscriber units, a signalling and control method comprising the steps of:
at a radio subscriber unit:
(a) transmitting a message representing a request to communicate; and,
(b) receiving a code representing a time duration during which said subscriber unit may communicate and communicating for a time interval not exceeding said time duration, else receiving a code representing a queue position indicating a number of other subscriber units that may communicate prior to said subscriber unit being allowed to communicate and displaying said queue position.

15. In a two-way communication system having a central station for allocating at least one communication channel among a plurality of subscriber units, a signalling method for apprising a subscriber of an approximate duration until a communication channel becomes available, comprising the steps of:
at a radio subscriber unit:
(a) transmitting a message representing a request to communicate;
(b) receiving a code representing a queue position indicating a number of other subscriber units that may communicate prior to said radio subscriber unit being allowed to communicate;
(c) displaying said queue position;
at the central station:
(a) receiving said message representing said request to communicate;
(b) determining how many other requests to communicate will be granted prior to said said request of said radio subscriber unit;
(c) transmitting said code representing said queue position.

16. In a two-way communication system having a central station for allocating at least one communication channel among a plurality of radio subscriber units each comprising:
means for transmitting a message representing a request to communicate;
means for receiving a code representing a time duration during which said subscriber unit may communicate; and,
means for communicating for a time interval not exceeding said time duration.

17. The subscriber unit of claim 16, wherein said communication means includes means for activating a warning indicator prior to expiration of said time duration.

18. In a two-way communication system having a central station for allocating at least one communication channel among a plurality of subscriber units each comprising:
radio means for transmitting a message representing a request to communicate;
means for receiving a code representing a queue position indicating a number of other subscriber units that may communicate prior to said subscriber unit being allowed to communicate; and,
means for displaying said queue position.

19. In a two-way communication system having a central station for allocating at least one communication channel among a plurality of subscriber units, and a means for interconnecting a telephone unit to said two-way communication system to facilitate communication between telephone units and radio subscriber units, a method for apprising a telephone unit of an approximate duration until a communication channel becomes available, comprising the steps of: at the central station:
(a) receiving a signal from a telephone unit representing a request to communicate;
(b) determining how many other requests to communicate will be granted prior to said request of said telephone unit;
(c) transmitting a voice message containing an indication of how many other units must communicate prior to said telephone unit being allowed to communicate;
at said telephone unit:
(a) accessing the central station thereby providing said signal; and,
(b) receiving said voice message containing said indicating how many other units may communicate prior to said telephone unit being allowed to communicate.

20. The method of claim 13, which includes the step of (d) receiving a code representing a time duration during which said radio subscriber unit may communicate.

21. The method of claim 20, which includes the step of (e) communicating for a time interval not exceeding said time duration.

22. The method of claim 21, wherein step (e) comprises the steps of:
(e1) programming a timer means to said time duration;
(e2) communicating for said time interval not exceeding the expiration of said timer means.

23. The method of claim 22, wherein step (e) comprises the steps of:
(e1) programming a timer means to said time duration;
(e2) communicating for said time interval not exceeding expiration of said timer means; and,
(e3) activating a warning signal a predetermined time before said timer means expires.

24. The method of claim 20, wherein step (a) comprises transmitting said message representing an emergency request to communicate.

25. The method of claim 24, wherein step (d) comprises receiving said code representing an unlimited time duration during which said radio subscriber unit may communicate.

26. The method of claim 15, which includes the radio subscriber unit step of (d) receiving a code representing a time duration during which said radio subscriber unit may communicate.

27. The method of claim 26, which includes the radio subscriber unit step of (e) communicating for a time interval not exceeding said time duration.

28. The method of claim 27, wherein step (e) comprises the steps of:
   (e1) programming a timer means to said time duration;
   (e2) communicating for said time interval not exceeding the expiration of said timer means.

29. The method of claim 27, wherein step (e) comprises the steps of:
   (e1) programming a timer means to said time duration;
   (e2) communicating for said time interval not exceeding expiration of said timer means; and,
   (e3) activating a warning signal a predetermined time before said timer means expires.

30. The method of claim 26, wherein step (a) comprises transmitting said message representing an emergency request to communicate.

31. The method of claim 30, wherein step (d) comprises receiving said code representing an unlimited time duration during which said radio subscriber unit may communicate.

32. A two-way radio communication system having a central station for allocating at least one radio communication channel among a plurality of radio subscriber units including means for apprising a subscriber of an approximate duration until a communication channel becomes available, the system comprising: at a radio subscriber unit:
   (a) radio-frequency transmitting means for transmitting a message representing a request to communicate;
   (b) receiving means for receiving a code representing a queue position indicating a number of other subscriber units that may communicate prior to said subscriber unit being allowed to communicate;
   (c) displaying means for displaying said queue position;
at the central station:
   (a) receiving means for receiving said message representing said request to communicate;
   (b) processing means for determining how many other requests to communicate will be granted prior to said said request of said subscriber unit;
   (c) transmitting means for transmitting said code representing said queue position.

* * * * *